United States Patent [19]
Gourley

[11] 4,074,876
[45] Feb. 21, 1978

[54] LONG-PLAY VIDEO TAPE CASSETTE

[75] Inventor: Dennis R. Gourley, Salt Lake City, Utah

[73] Assignee: Film Cassette Inc., Salt Lake City, Utah

[21] Appl. No.: 650,413

[22] Filed: Jan. 19, 1976

[51] Int. Cl.² ............................................. G11B 23/10
[52] U.S. Cl. ..................................... 242/199; 360/96
[58] Field of Search ............... 242/199, 200, 198, 197, 242/71.2, 194; 352/72, 73, 78; 360/96

[56] References Cited
U.S. PATENT DOCUMENTS

| | | | |
|---|---|---|---|
| 3,423,038 | 1/1969 | Katzef et al. | 242/71.2 X |
| 3,650,495 | 3/1972 | Boyer | 242/199 X |
| 3,791,609 | 2/1974 | Roma | 242/210 X |
| 3,797,779 | 3/1974 | Esashi et al. | 242/199 |
| 3,802,648 | 4/1974 | Kihara et al. | 242/199 |
| 3,873,045 | 3/1975 | Nemoto et al. | 242/199 |
| 3,918,802 | 11/1975 | Sakaguchi et al. | 242/197 |

Primary Examiner—George F. Mautz

[57] ABSTRACT

A long-play video tape cassette, adaptable for use in currently manufactured video tape players having cassette receivers of restricted imension. The subject cassette includes a tongue receivable in such tape player receiver and an enlarged portion for mounting a pair of operative reels. The cassette therefore will take the form of an L or T configuration. Reels are remotely driven by gear means keyed to the customary spindle receivers or sockets, and a series of guide, tensioning and constraining means are used to ensure that the video tape operates properly.

8 Claims, 5 Drawing Figures

LONG-PLAY VIDEO TAPE CASSETTE

FIELD OF INVENTION

The present invention relates to video tape equipment, and more particularly, to a long-play cassette which is constructed and adapted for reception in the short-girth receiver of a customary video tape playing machine engineered for smaller short-play cassettes.

DESCRIPTION OF PRIOR ART

As to conventional video tape players and cassettes, the same are designed for short playing periods of one hour or less and have reels of quite small diameter. These reels are customarily driven by spindles that key directly into the central portions of the reels.

For many types of programs it is highly desired to have cassettes that will store programs of two or three hours, or even more time, in order that a continuous play may be had without cassette substitution. The customary spindle sockets or receivers are conventionally made integral with the reels themselves.

In the past there has been no suitable provision for laterally disposed enlarged reels accommodating lengthened playing time in cassette form for video tape players having the customary slot receptacle for cassettes; likewise, appropriate structure to facilitate long play tapes has been absent in customary cassettes. The solution proposed is to engineer the large-reel cassette to fit laterally next to the player and yet suitable engage the player's receiving slot.

BRIEF SUMMARY OF INVENTION

According to the present invention a video tape cassette has a configuration that includes an enlarged, dimensioned to fit next to the player, base area for large reel mountings and also a tongue forming essentially an inside right angle with the base area, and of restricted dimension which will fit into the receivers of conventional video tape players. The forward and reverse drive spindles of the video tape player enter into meshed or keyed engagement with spindle sockets in the cassette of the present invention, but with such spindle sockets being provided with gear means providing a direct positive drive, via gear belts, with the enlarged video tape reels driven by such gear belts. Hence, the video tape reels are themselves provided with gearing means meshing with such gear belts. Post means are provided the cassette so that the tape will be routed properly into and throughout the tongue area for operation with the magnetic head of the tape player. Accordingly, means are provided for tensioning and otherwise positioning the tape properly in the restricted tongue of the cassette, yet providing for correct take-up and feed by the enlarged reels used. Thus, in the invention, the storate capacity of the new cassette is vastly increased.

OBJECTS

Accordingly, a principal object of the invention is to provide a long play video tape cassette for conventional tape-playing equipment.

A further object is to provide a cassette having an enlarged area for long-play reel mounting and yet a restricted portion that will fit into the receivers of conventional tape players.

A further object is to provide a video tape cassette wherein provision is made proximate the take-off portion of the cassette for ensuring proper routing and retention of the video tape without marring the surfaces thereof.

A further object is to provide a long-play video cassette having a receiver tongue provided with and accommodated by means for restricting the girth of the travel path of the video tape, and this in a manner accommodating proper operation of the enlarged reels of the cassette.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF PREFERRED EMBODIMENTS

Figure 1:
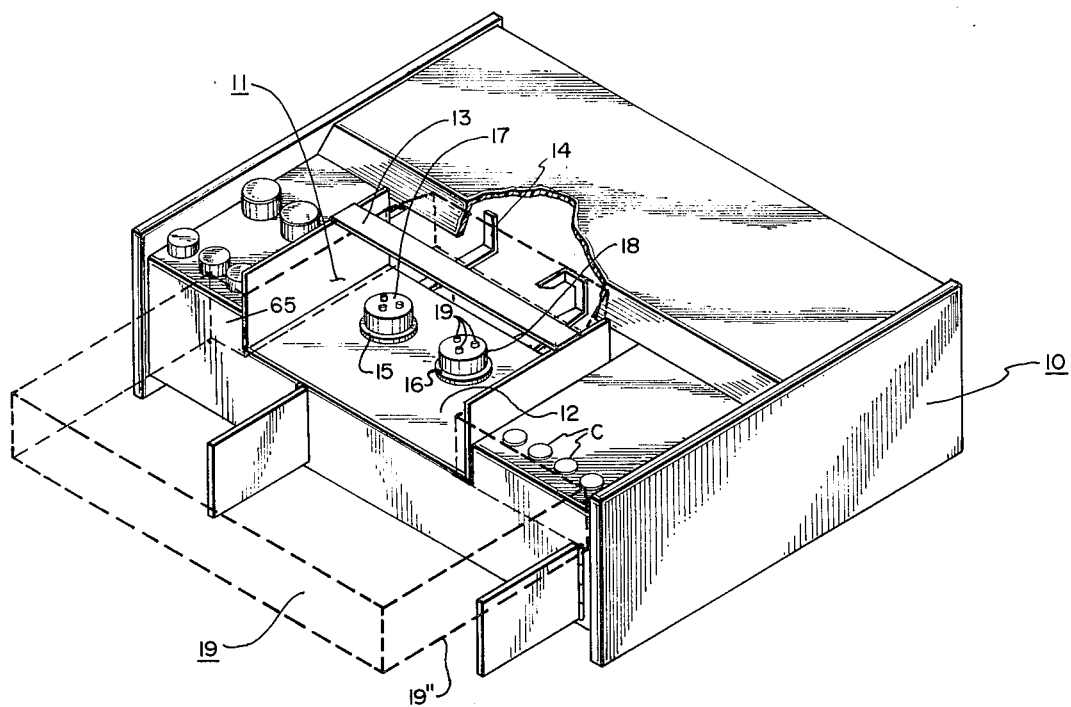
FIG. 1 is a perspective view of a conventional video tape player that can receive the enlarged video tape cassette of the present invention having a tongue designed for placement in the receiver thereof.

In FIG. 1 video tape player 10 is strictly conventional in design and includes the usual cassette receiver 11 comprising a cradle 12, hold-down bar 13 and angle stop means 14. The receiver has a pair of apertures 15 and 16 for receiving the revolving player drive/takeup spindles 17 and 18. These spindles are conventional, are supplied for both forward and reverse drives of conventional players, and include a series of spring-biased upstanding engagement pins 19'. Such spring-biased pins and their spindles are strictly conventional in any present-day video tape players and of themselves form no part of the present invention.

Phantom lines 19" indicate the position of longplaying cassette 19 of the present invention. The cradle 12 in essence defines the outline of a normal, short-play cassette having a one hour or less capacity. Thus, the customary short play reels will be engaged directly by spindles 17 and 18, and the reels will be contained completely within cradle 12 of the receiver 11.

Figure 2:
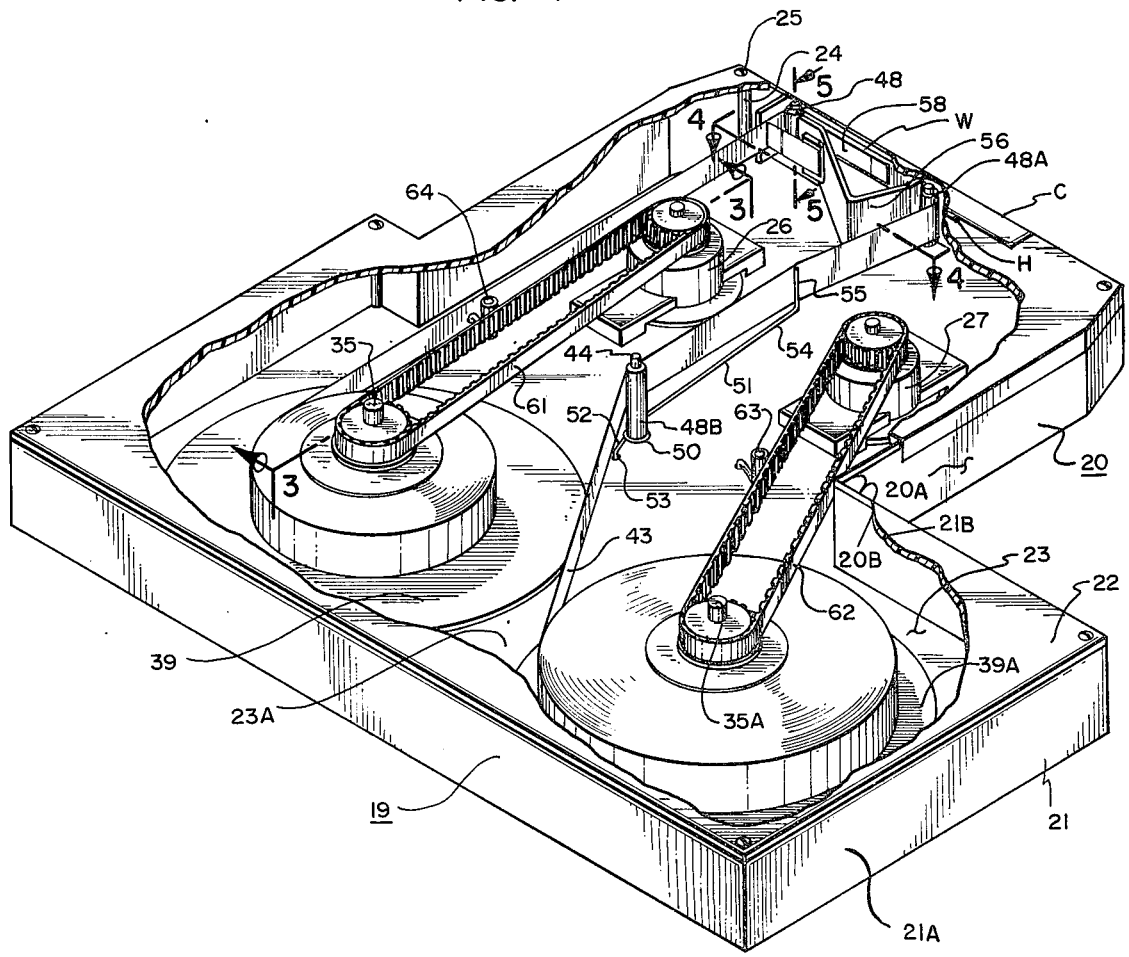
FIG. 2 is an enlarged perspective view, partially broken away for convenience of illustration, illustrating the operative parts of the cassette shown in dotted lines in FIG. 1.

The new, long-play cassette in this invention is essentially L or T configured and in any event will have an insertion tongue 20 which will fit the receiver 11 for insertion placement therein. Hold-down bar 13 keeps the tongue in proper downward position at all times. The tongue 20 and receiver 11 are essentially rectangularly configured and in normal or 90° relationship relative to player planar surface 65, all as shown in FIG. 1. Likewise, and as shown in FIG. 2, surfaces 20A and 21B form essentially an inside right angle 20B, whereby maximum sized reels 39, 39A may be used with a minimum of housing and belt materials and sizes, as shown The cassette 19 includes a case 21 comprising a cover 22 and a configured base 23. Base 23 will include a series of corner threaded bosses 24 for receiving attachment screws 25, by way of example, which retain cover 22. Spindle sockets 26 and 27 may be identical and include interior annularly spaced recesses 28 that receive spring-biased pins 19. Annular flanges 29 of the spindle sockets are retained in place by representative arcuate segments 30 and 31. Segment 30 may be liquid-welded or cemented, or even formed integrally with base 23. For securement purposes, the member 31 may be used to retain the flange 29 loosely in position by being secured to the base 23 by attachments 32.

Gear 33 is keyed to spindle socket 26 and in practice, the two, i.e. spindle socket with gear 33, may be molded together as an integral part. Should the gear be separate, then a spline or other attachment at 34 can be used to key the gear to spindle socket 26.

Figure 3:
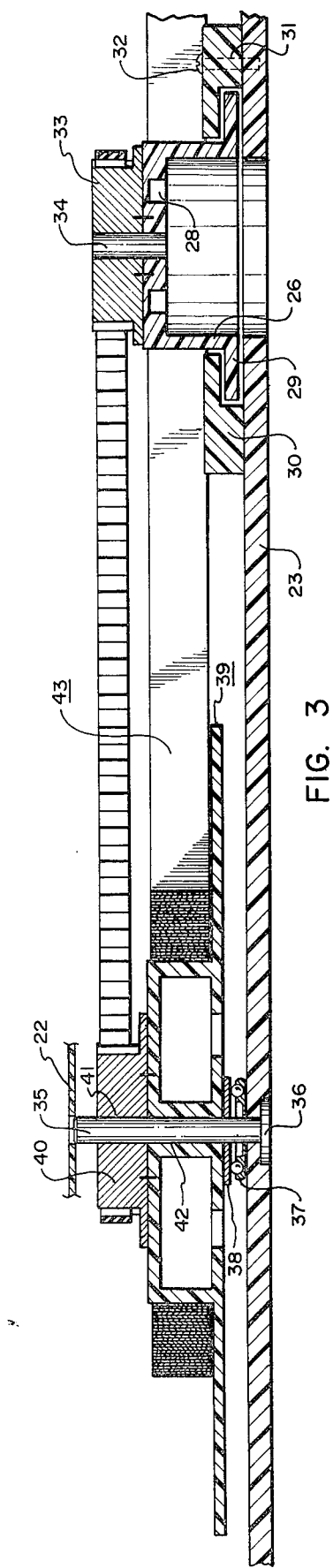
FIG. 3 is an enlarged vertical section taken along the dotted line 3—3 in FIG. 2.

Shaft 35 includes a head 36 and, in practice, can be fixedly molded to the base 23 in upstanding fashion as seen in FIG. 3. Disposed over and surrounding the shaft is a thrust bearing unit 37 provided with an upper race 38 or washer that supports reel 39. Video tape reel 39 includes a gear 40 keyed thereto, and these two, i.e. reel 39 and gear 40, may be molded together as a one-piece unit. Apertures 41 and 42 are provided for permitting the reel 39 with its gear to revolve freely about shaft 35. Reel 39, of course, holds the long-play video tape 43 of the invention.

Figure 5:
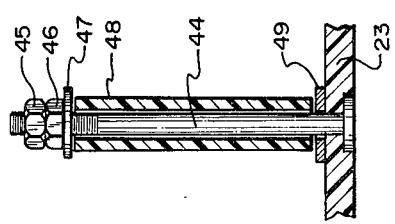
FIG. 5 is an enlarged fragmentary vertical section taken along the line 5—5 in FIG. 2, illustrating a representative video tape constraining roller or sleeve structure employed at various points in the cassette.

Also integrally molded with base 23 are a series of upstanding studs 44 provided with nut attachments 45 and 46 as well as washer 47 and rotatable sleeves 48. The sleeves 48 are free to rotate about the respective studs or bolts 44 and hence serve as rollers at each of three places, i.e. at 48 in FIG. 2. Each stud 44 may likewise be supplied with a bearing washer 49. It will be understood that the several locations of the rotatable anchored sleeves 48 are indicated at 48, 48A, and 48B in FIG. 2. Sleeve 48 in FIG. 5 is representative of sleeves 48, 48A and 48B in FIG. 2.

Figure 4:
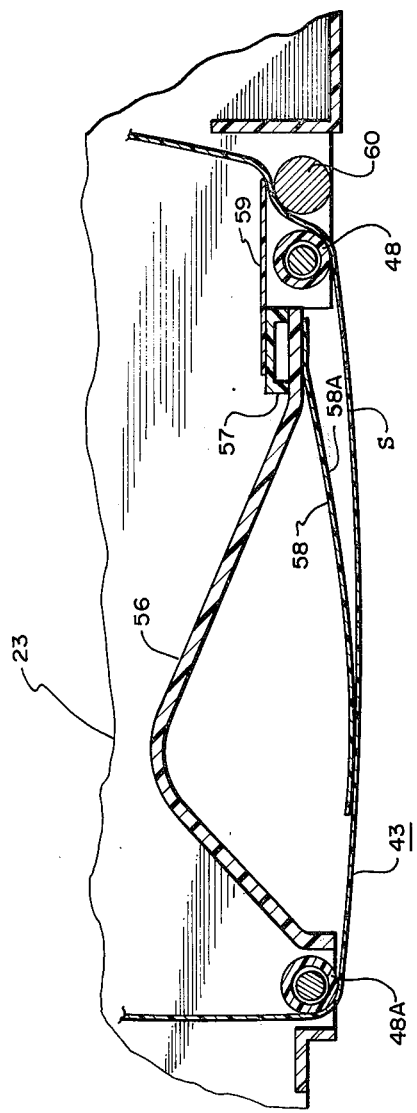
FIG. 4 is a horizontal section taken along the line 4—4 in FIG. 2 and illustrates in enlarged fragmentary view the operative and associate structure proximate the takeoff area of the cassette.

As to sleeve 48B and its washer, disposed therebeneath will be the loop 50 of tension spring 51, and the base 52 of which will be keyed into hole 53 of the base, and the elongate arm 54 of which is provided with an upstanding finger 55 serving to press against, and hence tension the tape 43, see FIG. 2. The tape loops about sleeves 48, 48A and 48B as shown in FIG. 2. As to tongue portion, see FIGS. 2 and 4, there will exist, upstanding from the base 23, a rigid arcuate portion 56 and also portion 57, rigid and integral with base 23 which provide mounts for soft, leaf-like resilient tension strips 58 and 59 that are respectively cemented thereto and serve to retain the video tape 43 in its intended position, see FIG. 4. There will be some slight give to these strips, preferably made from a low-friction material such as that going under the tradename Mylar; however, these will urge outwardly the tape at those portions engaged by the strips for proper operation of the equipment.

Strip 59 serves to keep the tape against upstanding post 60, a solid post that can be molded with the base 23. Accordingly, tape 43 proceeds about roller 48A, past and in engagement with Mylar strip 58 and its soft, sliding, non-abrasive surface 58A, about roller or sleeve 48 and then between the end of Mylar strip 59 and post 60, the strip 59, serving to keep the video tape against such post 60. Chain belts 61 and 62 may be made of rubber, Neoprene, or other belt material, and may be provided with suitable belt tensioning means as by spring-loaded rollers 63 and 64 pressing against the sides of the same, as indicated in FIG. 2.

The operation of the equipment is as follows:

It is to be noted at the outset that the receiver 11 is restricted in girth for the customary short-play video tape reels mounted directly on spindles 17 and 18 and completely within such cradle. In the present invention the tongue 20 of the new long-playing video cassette still fits in such cradle; however, its laterally enlarged extension or portion 20A, see FIG. 2, incorporates an enlarged base portion 23A that will accommodate the placement of long-play reels 39 and 39A as shown in FIG. 2, both being similar in construction as seen in FIG. 3. Additionally, both of the flexible forward and reverse drive mounts 26 and 27 comprising spindle sockets will be identical and mutually spaced as seen in FIG. 2. The video tape will be routed in the manner seen in FIGS. 2 and 4, such that the surface S is available for sensing by the magnetic head of player 10. Flexibility at surface S, ensuring that the tape will be resiliently urged outwardly, is provided by the Mylar leaf strip 58 which is secured to portion 56, is slightly resilient and yet ensures proper tape placement. The anchored sleeves 48A and 48B are required, with leaves 58,9 and spring 55 to ensure that the tape will be taut. Tautness in the chain bolts is assured where springbiased rollers 63 or 64 are employed as seen in FIG. 2.

The tape may be advanced either in forward or reverse direction by conventional controls C of video player 10, this by virtue of the engagement of spindles 17 and 18 with spindle sockets 26 and 27.

The enlarged reels, which could not be accommodated by spindles 17 and 18 as in connection with direct mounting thereto, are none the less remotely positioned and journaled at enlarged base portion 23A so that gear or other drives can drive the enlarged reels about their upstanding fixed shaft posts 35 and 35A, of identical construction. Reels 39 and 39A again, may be likewise identical in construction and thrust bearings support.

In practice, it is convenient to make the tape reel sufficiently large so as to accommodate 2, 3, or more hours of video tape playing them. This is of enormous convenience, indicating that long programes can be taped and played without interruption or cassette substitution.

The window W of the cassette allowing for magnetic or electromagnetic sensing of the tape will generally be an open aperture; however, certain types of magnetically permeable thin covers are possible for inclusion at window W. In any event, and as is customary with conventional cassettes, a conventional hinged cover C, hinged at H, may be provided as a dust protector for the tape, in the usual manner.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. For a video tape player having a planar surface and an inwardly directed rectangular slot disposed normal to said surface, a long-play video tape cassette including, in combination, a housing having an enlarged portion and a lateral essentially rectangular tongue extending therefrom and provided with a tape sensing window, said enlarged portion and said lateral tongue having proximate, planar, outer surfaces forming essentially a 90° inside angle, whereby said planar surface of said enlarged portion may be disposed parallel to and proximate said housing and said planar surface thereof; a pair of video tape reels journalled in said enlarged portion for operative movement; first means mounted in said lateral tongue for driving said reels; and second means for routing the video tape of said reels up to and past said window, said reels being provided video tape.

2. The video tape cassette of claim 1 wherein said first means comprises a pair of mutually spaced, rotatable spindle sockets secured for revolvement within said housing and accessible for video tape player drive, and third means intercoupling said spindle sockets with said reels.

3. The video tape cassette of claim 2 wherein each of said spindle sockets and reels include a respective, keyed gear portion, said third means comprising a pair of gear belts respectively engaging a respective one of said gear portions of a respective reel with a respective portion of a respective spindle socket, one of said gear belts being proximate said inside angle.

4. The structure of claim 1 wherein said housing includes a series of internal, vertically journalled rollers for guiding video tape from said reels into and through said tongue portion past said window.

5. The structure of claim 1 wherein said housing is provided with at least one, outwardly arcuate, low friction leaf means for constraining outwardly said video tape past said window.

6. The combination of claim 1 wherein said housing is provided with a pair of video tape constraining leaf means for properly engaging and thereby constraining said video tape for proper movement proximate and past said window.

7. The combination of claim 1 wherein said housing is provided with a pair of vertically journalled rollers guiding video tape towards said window, and spring means extending between said rollers for impinging and thereby taking up any slack present in said video tape.

8. The structure of claim 1 wherein said first means include a pair of externally engageable spindle sockets and means for loosely mounting said spindle sockets to said housing for spindle alignment and socket rotation.

* * * * *